United States Patent
Yan et al.

(10) Patent No.: US 12,240,511 B2
(45) Date of Patent: Mar. 4, 2025

(54) TRAIN CONTROL METHOD, COMPUTER DEVICE, AND STORAGE MEDIUM

(71) Applicant: BYD COMPANY LIMITED, Guangdong (CN)

(72) Inventors: Hang Yan, Shenzhen (CN); Kaikuo Zhuo, Shenzhen (CN); Weihua Liu, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 183 days.

(21) Appl. No.: 18/113,209

(22) Filed: Feb. 23, 2023

(65) Prior Publication Data

US 2023/0192163 A1    Jun. 22, 2023

Related U.S. Application Data

(63) Continuation of application No. PCT/CN2021/114354, filed on Aug. 24, 2021.

(30) Foreign Application Priority Data

Aug. 28, 2020  (CN) .......................... 202010885424.6

(51) Int. Cl.
*B61L 15/00*    (2006.01)
*B61L 27/04*    (2006.01)
*G05B 13/02*    (2006.01)

(52) U.S. Cl.
CPC ............ *B61L 27/04* (2013.01); *G05B 13/027* (2013.01)

(58) Field of Classification Search
CPC ....... B61L 15/0058; B61L 27/04; B61L 27/16
See application file for complete search history.

(56) References Cited

U.S. PATENT DOCUMENTS

| | | | |
|---|---|---|---|
| 5,583,769 A | 12/1996 | Saitoh | |
| 6,980,894 B1 * | 12/2005 | Gordon | B61L 15/0058 701/19 |
| 9,714,885 B2 * | 7/2017 | Qin | G01M 17/10 |
| 2004/0238693 A1 | 12/2004 | Cole | |
| 2016/0233676 A1 * | 8/2016 | Bosch | G05B 13/026 |
| 2017/0334414 A1 * | 11/2017 | Kumar | B60T 8/175 |
| 2018/0194233 A1 * | 7/2018 | Müller | B60L 7/18 |
| 2018/0232585 A1 * | 8/2018 | Kim | G05D 1/0246 |
| 2021/0107539 A1 * | 4/2021 | Howard | G06F 18/241 |

(Continued)

FOREIGN PATENT DOCUMENTS

| | | |
|---|---|---|
| CN | 105209314 A | 12/2015 |
| CN | 107878448 A | 4/2018 |

(Continued)

OTHER PUBLICATIONS

International Search Report and Written Opinion for Application No. PCT/CN2021/114354, mailed on Nov. 30, 2021, 9 pages.

*Primary Examiner* — Long T Tran

(57) ABSTRACT

A train control method includes: acquiring a current control level of the train and outputting the current control level to a train traction control system; acquiring current train operation data and calculating an evaluation score according to the current train operation data by the train traction control system; and inputting the current train operation data and the evaluation score into a neural network learning system to adjust the current control level of the train to obtain a final outputted control level.

20 Claims, 3 Drawing Sheets

(56) References Cited

U.S. PATENT DOCUMENTS

2021/0107543 A1* 4/2021 Howard .................. G06N 3/08
2021/0107545 A1* 4/2021 Howard .................. B61L 27/16

FOREIGN PATENT DOCUMENTS

| CN | 107891887 A | 4/2018 |
| CN | 109871007 A | 6/2019 |
| CN | 110040158 A | 7/2019 |
| CN | 110884535 A | 3/2020 |
| DE | 102016121363 A1 | 5/2018 |

* cited by examiner

TRAIN CONTROL METHOD, COMPUTER DEVICE, AND STORAGE MEDIUM

CROSS-REFERENCE TO RELATED APPLICATIONS

This application is a Continuation Application of International Patent Application No. PCT/CN2021/114354, filed on Aug. 24, 2021, which is based on and claims priority to and benefits of Chinese Patent Application No. 202010885424.6, entitled "TRAIN CONTROL METHOD, COMPUTER DEVICE, AND STORAGE MEDIUM" and filed on Aug. 28, 2020. The entire content of all of the above-referenced applications is incorporated herein by reference.

FIELD

The present disclosure relates to the field of train control technologies, and more specifically, to a train control method, a computer device, and a storage medium.

BACKGROUND

Currently, in the related art, in order to realize precise train parking, a debugging person collects train performance data such as a traction force and a braking force outputted from each control level of a train as well as a train response delay and presets the collected train performance data in a vehicle on-board controller (VOBC) system, and the VOBC system calculates a train level according to the collected data, so as to realize precise parking.

The existing solution mainly has the following shortcomings.

(1) The precision of the collected data is low. In a debugging process, a debugging track needs to be free of bends and slopes, and a serious interference from any external conditions should be avoided during the debugging. However, on a real line, it is difficult to satisfy these conditions. In addition, since a speed sensor and a wheel diameter have certain errors, the collected train performance data has certain errors.

(2) The debugging period is long. Since the collected data has errors, collection needs to be performed a plurality of times to eliminate some of the errors, resulting in a longer debugging period.

SUMMARY

The present disclosure provides a train control method, a computer device, and a storage medium, to resolve the problems in the related art such as a low data precision and a long debugging period caused by manual data collection during realization of precise train parking.

According to a first aspect, the present disclosure provides a train control method, including: acquiring a current control level of the train and outputting the current control level to a train traction control system; acquiring current train operation data and calculating an evaluation score according to the current train operation data by the train traction control system; and inputting the current train operation data and the evaluation score into a neural network learning system to adjust the current control level of the train to obtain a final outputted control level.

According to a second aspect, the present disclosure provides a computer device, which includes a memory, a processor, and a computer program stored in the memory and executable in the processor. When the processor executes the computer program, the steps of the method described in the first aspect of the present disclosure are implemented.

According to a third aspect, the present disclosure provides a non-transitory computer-readable storage medium. The non-transitory computer-readable storage medium stores a computer program. When the computer program is executed by the processor, the steps of the method described in the first aspect of the present disclosure are implemented.

The present disclosure provides the train control method, the computer device, and the storage medium. The train control method includes: acquiring the control level of the train and outputting the control level to the train traction control system; acquiring the train operation data and calculating the evaluation score according to the train operation data during operation of the train traction control system; and inputting the train operation data and the evaluation score into the neural network learning system to adjust the control level of the train. Through the present disclosure, manual train debugging and an interference brought by an operation environment are avoided, so that a manual debugging period is greatly shortened, and the train can realize precise parking more stably. Moreover, a control train status is evaluated, and a vehicle on-board controller (VOBC) compares and evaluates the actual train operation data with the calculated data, so that the VOBC system can automatically evaluate the train control status without the manual evaluation, and the VOBC can automatically identify a change in the train performance or the operation environment. In addition, the neural network learning system is added, so that the VOBC can make a directional adjustment according to an interference identified by a train control status evaluation system and feed the adjustment data back to an outputted train control level calculation system in the VOBC, which can indirectly adjust the outputted train control level, thereby reducing the impact of the interference.

BRIEF DESCRIPTION OF THE DRAWINGS

To describe the technical solutions in the embodiments of the present disclosure more clearly, the drawings required for describing the embodiments of the present disclosure are briefly described below. Apparently, the drawings in the following description show merely some embodiments of the present disclosure, and a person of ordinary skill in the art may derive other drawings from these accompanying drawings without creative efforts.

DETAILED DESCRIPTION

The technical solutions in the embodiments of the present disclosure are clearly and completely described below with reference to the drawings in the embodiments of the present disclosure. Apparently, the described embodiments are merely some of the embodiments of the present disclosure rather than all of the embodiments. All other embodiments obtained by a person of ordinary skill in the art based on the embodiments of the present disclosure without creative efforts shall fall within the protection scope of the present disclosure.

A train control method provided in an embodiment of the present disclosure is applicable to a vehicle on-board controller (VOBC) to automatically identify an interference in different scenes and make a corresponding adjustment in response to the interference. A train control status evaluation system and a neural network learning system are added inside the VOBC to realize precise automatic parking.

Figure 1:
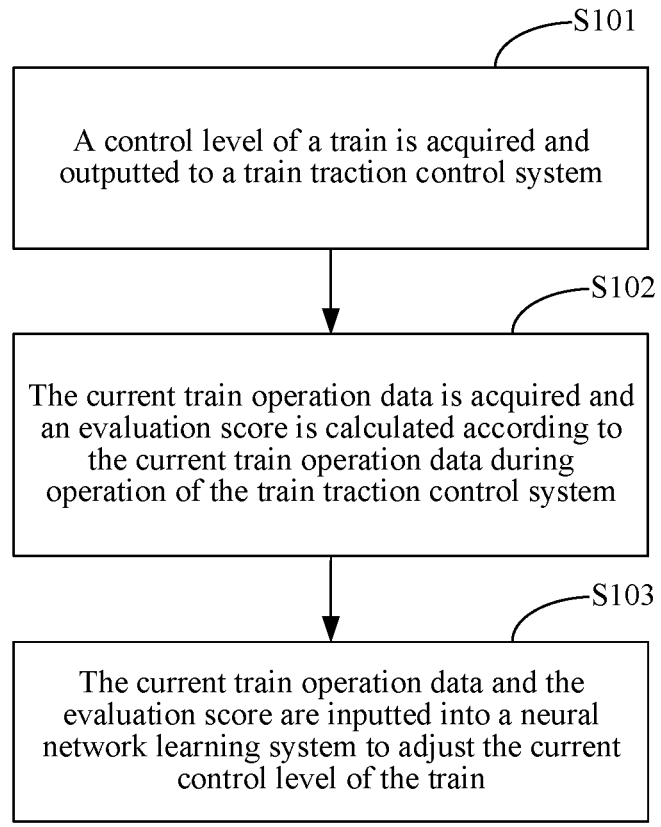
FIG. 1 is a flowchart of a train control method according to an embodiment of the present disclosure.

In an embodiment, as shown in FIG. 1, a train control method is provided, which includes steps S101, S102, and S103. The specific steps are as follows.

Step S101: A current control level of a train is acquired and outputted to a train traction control system.

The control level of the train may be acquired in the following way: acquiring a control curve of the train, and calculating the current control level of the train according to the control curve. The control curve of the train may be calculated first through a configured train parameter and target point data in an electronic map, and then the current control level of the train may be calculated according to the train control curve. For example, a preset braking curve is set. The preset braking curve is a curve representing correlations between a distance from a train to a parking point and a preset speed of the train. The preset braking curve can reflect a relationship between the distance from a normally-operated train to the parking point and the preset speed of the train during braking. The preset speed is a speed of the normally-operated train during the braking. The preset braking curve can be an automatic driving braking curve, which includes a safe braking model (SBM) curve, a full service braking (FSB) curve, and the like. During electric braking of the train, it is ensured that a current speed of the train can continuously follow the preset braking curve, that is, a curve in which the current speed of the train varies with the distance between the train and the parking point is consistent with the preset braking curve. The current control level is outputted for the electric braking by comparing the current speed with the preset speed corresponding to a current distance between the train and the parking point.

Step S102: The current train operation data is acquired and the evaluation score is calculated according to the current train operation data during the operation of the train traction control system.

In this step, by setting the train control status evaluation system, the current train control status can be scored according to the real-time train operation data that is acquired.

Figure 2:
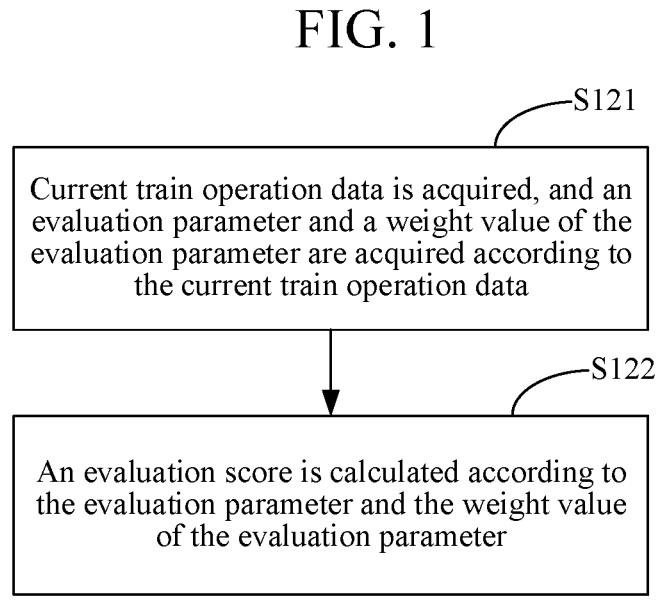
FIG. 2 is a flowchart of step S102 in the train control method according to an embodiment of the present disclosure.

In an implementation, as shown in FIG. 2, step S102 includes the following steps S121 and S122.

Step S121: Current train operation data is acquired, and an evaluation parameter and a weight value of the evaluation parameter are acquired according to the current train operation data.

Step S122: The evaluation score is calculated according to the evaluation parameter and the weight value of the evaluation parameter.

The evaluation parameter is a parameter used for scoring the train control status. The evaluation parameter may be calculated through the acquired real-time operation data and configuration data. The weight value is a proportion of each evaluation parameter.

Further, step S121 includes:
acquiring an actual train operation speed, a current control level, and a train control delay;
acquiring a speed difference according to the actual train operation speed and a configured speed;
acquiring an actual acceleration value according to the current control level, and acquiring an acceleration difference according to the actual acceleration value and a configured acceleration value;
acquiring a delay difference according to the train control delay and a configured delay; and
acquiring a weight value of each of the speed difference, the acceleration difference, and the delay difference.

The real-time train operation data includes the actual train operation speed, the current control level, and the train control delay. The configuration data includes a configured speed corresponding to the actual train operation speed, a configured acceleration corresponding to the control level, and a configured delay corresponding to the train control delay. The calculated evaluation parameter includes the speed difference, the acceleration difference, and the delay difference.

Further, step S122 includes:
calculating the evaluation score according to the speed difference, the acceleration difference, the delay difference, and the weight value corresponding to each piece of the data.

Evaluation score A is calculated according to the following evaluation formula:

$$\text{Evaluation score } A = \alpha \times \text{speed difference} + \beta \times \text{acceleration difference} + \gamma \times \text{delay difference} + \delta.$$

$\alpha$, $\beta$, and $\gamma$ are weight values of the evaluation parameters. $\delta$ is a tolerance error.

A weight value constraint function is: $\alpha+\beta+\gamma=C$, where C is a constant, C may be configured, and C is 1 by default.

Step S103: The current train operation data and the evaluation score are inputted into a neural network learning system to adjust the current control level of the train.

When the evaluation score is low, it indicates that an error occurs during the train control. Therefore, the current train control level is adjusted and outputted correspondingly through the neural network learning.

Figure 3:
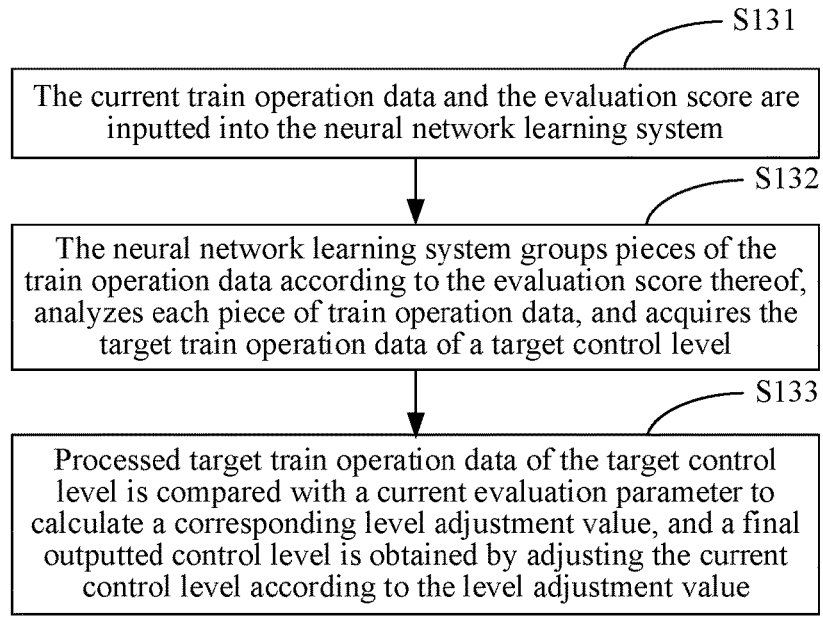
FIG. 3 is a flowchart of step S103 in the train control method according to an embodiment of the present disclosure.

In an implementation, as shown in FIG. 3, step S103 includes the following steps.

Step S131: The current train operation data and the evaluation score are inputted into the neural network learning system.

Step S132: The neural network learning system groups pieces of the train operation data according to the evaluation score thereof, analyzes each piece of the train operation data, and acquires target train operation data of a target control level.

For learning, the neural network learning system compares the evaluation score with a preset value or threshold to classify and group pieces of the train operation data. The train operation data with an evaluation score lower than the preset value or greater than the preset value is used as a learning sample for analysis. When the evaluation score is normal (e.g., the evaluation score is higher than the preset value), the current control level of the train does not need to be adjusted, and when the evaluation score is lower than the preset value, the current control level of the train needs to be adjusted.

The following implementation is merely an example of the neural network, and does not limit a structure of the neural network. For example, the neural network includes three BP neural networks, and each of the BP neural networks includes an input layer, a middle layer, and an output layer. The input layer includes two input nodes. The middle layer includes two hidden layers. A first hidden layer includes three hidden nodes, and a second hidden layer includes two hidden nodes. The output layer includes an output node. The second hidden layer of a third BP neural network includes four hidden nodes, and the output layer includes two output nodes. A first BP neural network, a second BP neural network, and a third BP neural network are cascaded in sequence. The output node of the output layer of the first BP neural network is connected with the second hidden layer of the middle layer of the second BP neural network layer. The output node of the output layer of the second BP neural network is connected with the second hidden layer of the middle layer of the third BP neural network. Network weights of the hidden layers of the three BP neural networks are determined through dynamic error corrections according to an error reverse propagation principle, and initial values of the network weights are obtained according to experimental and empirical values. A train control status evaluation system transmits the data detected in real time (e.g., the current train operation data) to an expert system, and the expert system calls data in a knowledge base (e.g., the target train operation data) for comparison with the data detected in real time. It is determined whether the system is faulty through speculation and analysis by a neural network inference machine. When a fault occurs, the weight of each element in the hidden layer of the middle layer is adjusted to treat the fault.

Step S133: Processed target train operation data of the target control level (e.g., a target evaluation parameter configured for the train) is compared with a corresponding current evaluation parameter to calculate a corresponding level adjustment value, and a final outputted control level is obtained by adjusting the current control level according to the level adjustment value.

The control level corresponds to the acceleration value, and the current control level may be adjusted by adjusting the acceleration value. An acceleration value of a piece of train operation data with an evaluation score lower than the preset value is acquired, the acquired acceleration value is compared with a normal acceleration value of a normal evaluation score learned from the neural network to obtain the level adjustment value, so as to adjust the current control level of the train.

In an implementation, step S133 includes:
  outputting the level adjustment value of a piece of train operation data with an evaluation score lower than the preset value to the train traction control system; and
  controlling, by the train traction control system, operation of the train according to the current control level of the train and the corresponding level adjustment value.

The current control level and the level adjustment value corresponding to a position of the train are transmitted to an on-board ATO device, to cause the on-board ATO device to perform a weighting operation on a control level calculated by the on-board ATO device corresponding to the train position according to the level adjustment value and the current control level, and then output a result of the control level to the train to control the operation of the train.

Figure 4:
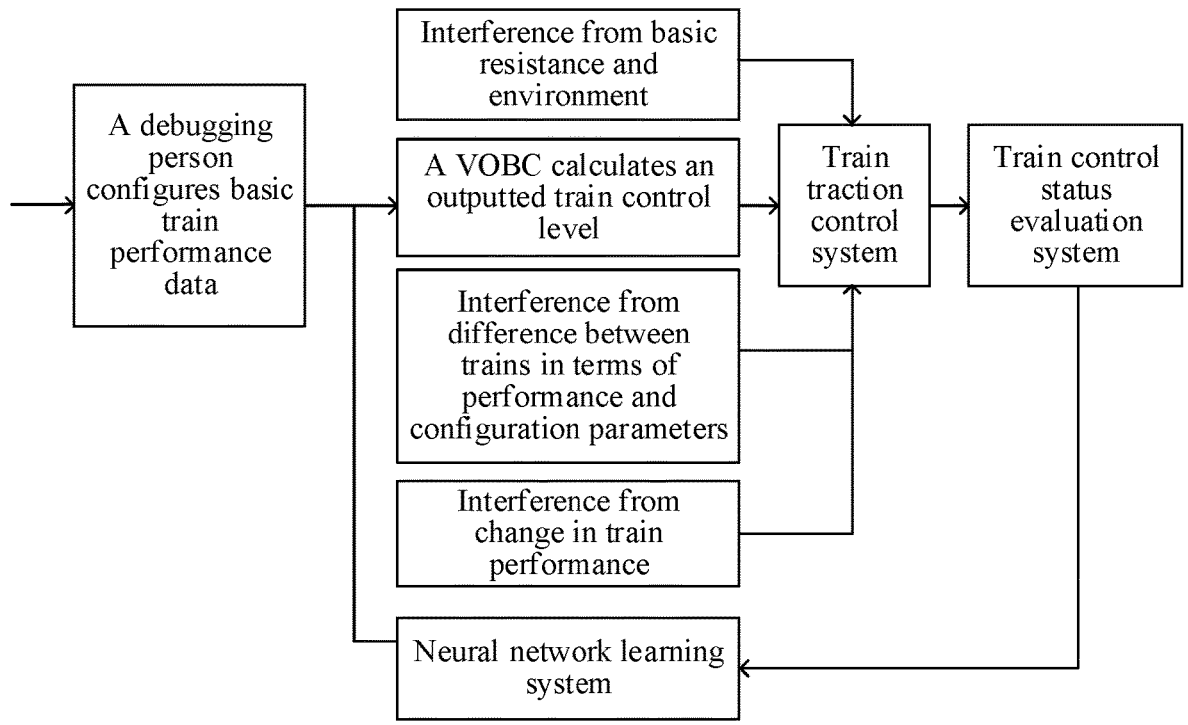
FIG. 4 is a flowchart of the train control method according to another embodiment of the present disclosure.
Figure 5:
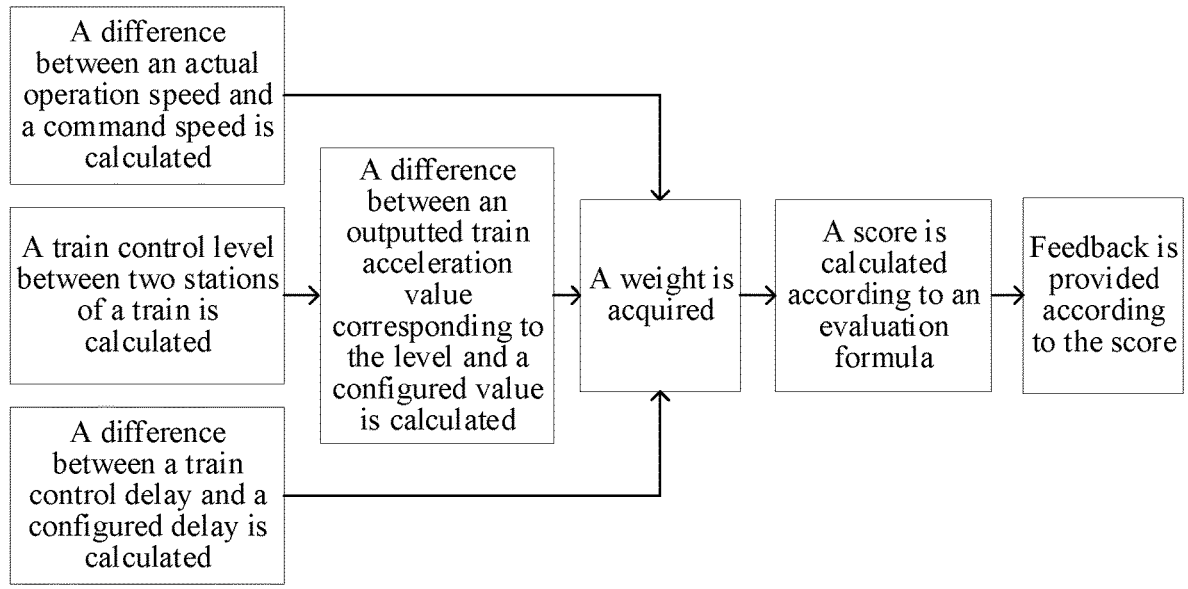
FIG. 5 is a flowchart of the train control method according to another embodiment of the present disclosure.

Detailed description of the present disclosure is provided below according to FIG. 4 and FIG. 5.

The control level corresponding to the train is calculated through the configured train parameter and outputted to the train traction control system. The following interference exists during the operation of the train traction control system: an interference from a basic resistance and the environment, an interference from differences between trains in terms of performance and configurations, and an interference from a change in the train performance. The train control status evaluation system records actual train operation process data and performs statistics on the actual train operation process data, and calculates a current train control status evaluation score according to the corresponding weight values. The actual train operation process data includes an outputted control level, an actual train operation speed, and a control delay. The actual operation process data is compared with corresponding calculated target data. The target data includes a command speed, and an acceleration and a response delay corresponding to the outputted control level. Then the evaluation score value is calculated according to the weight for each data type and the scoring formula, and is inputted to the neural network learning system. The neural network learning system includes an input layer, a hidden layer, and an output layer. The input layer includes an evaluation value outputted by the evaluation system and comparison values of various types of data calculated in the evaluation system. The output layer includes the weight adjustment value corresponding to each control level. The weight value of each neuron in the hidden layer may be adjusted according to the comparison value between the actual operation data and the target data as well as the train control status evaluation value. The adjustment of the control level is more accurate after a plurality of attempts, and the impact of an external interference on the control system is eliminated.

In the present disclosure, after the abnormal train control occurs, the train control data is automatically evaluated, to determine a magnitude of the impact of the interference to the train on the train control, and the corresponding level adjustment value is automatically calculated for adjustment after the calculated data is learned through the neural network system. After continuous self-adjustment, the impact of the external interference on the train is gradually eliminated, thereby realizing stable and precise automatic parking.

Through the train control method provided in the present disclosure, manual train debugging and an interference brought by an operation environment are avoided, so that a manual debugging period is greatly shortened, and the train can realize precise parking more stably. Moreover, the train control status is evaluated, and the VOBC compares and evaluates the actual train operation data with the calculated data, so that the VOBC system can automatically evaluate the train control status without the manual evaluation, and the VOBC can automatically identify a change in the train performance or the operation environment. In addition, the neural network learning system is added, so that the neural network learning system is added, so that the VOBC can make a directional adjustment according to an interference identified by a train control status evaluation system and feed the adjustment data back to an outputted train control level calculation system in the VOBC, which can indirectly adjust the outputted train control level, thereby reducing the impact of the interference.

Figure 6:
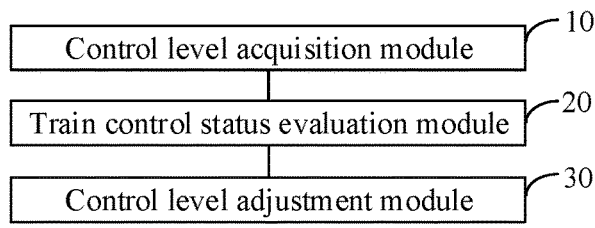
FIG. 6 is a schematic structural diagram of a train control apparatus according to an embodiment of the present disclosure.

Another embodiment of the present disclosure provides a train control apparatus. As shown in FIG. 6, the train control apparatus includes:

a control level acquisition module 10, configured to acquire a current control level of a train and output the current control level to a train traction control system;

a train control status evaluation module 20, configured to acquire current train operation data and calculate an evaluation score according to the current train operation data by the train traction control system; and a control level adjustment module 30, configured to input the current train operation data and the evaluation score into a neural network learning system to adjust the current control level of the train.

Further, the control level acquisition module 10 is configured to:

acquire a control curve of the train, and calculate the current control level of the train according to the control curve.

Further, the train control status evaluation module 20 is configured to:

acquire the current train operation data, and acquire an evaluation parameter and a weight value of the evaluation parameter according to the current train operation data; and calculate the evaluation score according to the evaluation parameter and the weight value of the evaluation parameter.

Further, the train control status evaluation module 20 is configured to:

calculate an evaluation score A according to the following evaluation formula:

Evaluation score $A = \alpha \times$ speed difference $+ \beta \times$ acceleration difference $+ \gamma \times$ delay difference $+ \delta$.

$\alpha$, $\beta$, and $\gamma$ are weight values of the evaluation parameters. $\delta$ is a tolerance error.

A weight value constraint function is: $\alpha + \beta + \gamma = C$, where C is a constant, C may be configured, and C is 1 by default.

Further, the train control status evaluation module 20 is further configured to:

acquire an actual train operation speed, a current control level, and train control delay;

acquire a speed difference according to the actual train operation speed and a configured speed;

acquire an actual acceleration value according to the current control level, and acquire an acceleration difference according to the actual acceleration value and a configured acceleration value;

acquire a delay difference according to the train control delay and a configured delay;

acquire a weight value of each of the speed difference, the acceleration difference, and the delay difference; and calculate the evaluation score according to each piece of the data (e.g., each of the evaluation parameters) including the speed difference, the acceleration difference, the delay difference, and the weight value corresponding to each piece of the data.

Further, the control level adjustment module 30 is configured to:

input the current train operation data and the evaluation score into the neural network learning system;

determine, by the neural network learning system, whether the evaluation score of the current train operation data is lower than a preset value or a threshold, analyze the current train operation data if the evaluation score lower than the preset value to determine a target train control level, and acquire target train operation data of the target train control level; and process the target train operation data of the target control level to obtain a target evaluation parameter configured for the train, compare the configured target evaluation parameter with the evaluation parameter of the current train operation data to calculate a corresponding level adjustment value, and adjust the current control level according to the level adjustment value to obtain the final outputted control level.

Further, the control level adjustment module 30 is further configured to:

output the level adjustment value of the current train operation data to the train traction control system; and control, by the train traction control system, operation of the train according to the current control level of the train and the corresponding level adjustment value, that is, according to the final outputted control level of the train.

For a specific limitation on the train control apparatus, reference may be made to the limitation on the train control method in the above, and the details are not described herein again. All or some of modules in the train control apparatus may be implemented by a software, a hardware, or a combination thereof. The foregoing modules may be built in or independent of a processor of a computer device in a form of hardware, or may be stored in a memory of the computer device in a form of software, so that the processor invokes and performs an operation corresponding to each of the foregoing modules.

Figure 7:
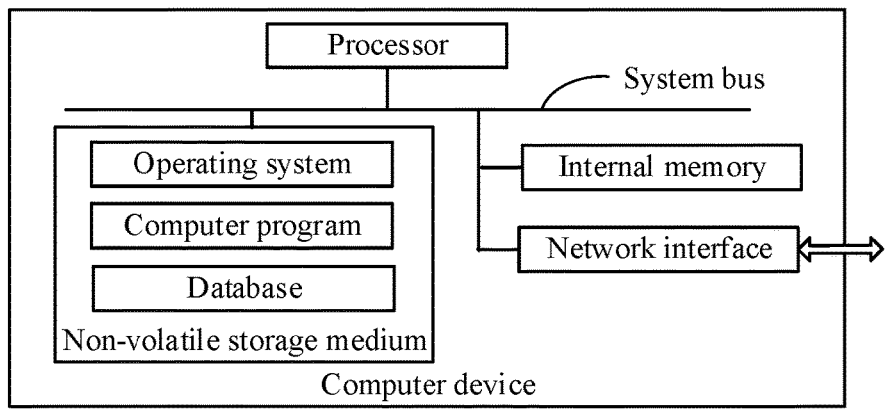
FIG. 7 is a schematic diagram of a computer device according to an embodiment of the present disclosure.

In an embodiment, a computer device is provided. The computer device may be a server. An internal structure diagram of the server may be shown in FIG. 7. The computer device includes a processor, a memory, a network interface, and a database connected through a system bus. The processor of the computer device is configured to provide computing and controlling capabilities. The memory of the computer device includes a non-volatile storage medium and an internal memory. The non-volatile storage medium stores an operating system, a computer program, and the database. The internal memory provides an environment for the running of the operating system and the computer program in the non-volatile storage medium. The database of the computer device is configured to store the data used in the train control method of the foregoing embodiment. The network interface of the computer device is configured to connect and communicate with an external terminal through a network. The computer program, when executed by the processor, implements the train control method.

In an embodiment, a computer device is provided, which includes a memory, a processor, and a computer program stored in the memory and executable in the processor. The processor implements the train control method in the foregoing embodiment when executing the computer program.

In an embodiment, a non-transitory computer-readable storage medium is provided, which stores a computer program. The computer program, when executed by a processor, implements the train control method in the foregoing embodiment.

A person of ordinary skill in the art may understand that all or some of processes of the method in the foregoing embodiment may be implemented by instructing relevant hardware through a computer program. The computer program may be stored in a non-volatile computer-readable storage medium. The program, when executed, may include the processes of the embodiments of the methods described above. Any reference to the memory, the storage, the database, or other media used in the embodiments provided in the present disclosure may include a non-volatile memory or a volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache. By way of description rather than limitation, the RAM may be obtained in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM), a Rambus Direct RAM (RDRAM), a Direct Rambus Dynamic RAM (DRDRAM), and a Rambus Dynamic RAM (RDRAM).

A person skilled in the art may clearly understand that, for convenience and brevity of description, only division of the foregoing functional units and modules is illustrated. In actual applications, the foregoing functions may be assigned to different functional units and modules for completion as required, that is, an internal structure of the apparatus is divided into different functional units or modules to complete all or some of functions described above.

The foregoing embodiments are merely used for describing the technical solutions of the present disclosure and are not for limiting the present disclosure. Although the present disclosure is described in detail with reference to the above embodiments, it is to be understood by a person skilled in the art that they may still make modifications to the technical solutions described in the foregoing embodiments or make equivalent replacements to some technical features therein. The modifications or the replacements do not cause the essence of the corresponding technical solutions to depart from the spirit and the scope of the technical solutions of the embodiments of the present disclosure, and all fall within the protection scope of the present disclosure.

What is claimed is:

1. A method for controlling a train, comprising:
   acquiring a current control level of the train and outputting the current control level to a train traction control system;
   acquiring current train operation data and calculating an evaluation score according to the current train operation data by the train traction control system; and
   inputting the current train operation data and the evaluation score into a neural network learning system to adjust the current control level of the train to obtain a final outputted control level.

2. The method according to claim 1, wherein the acquiring a current control level of a train comprises:
   acquiring a control curve of the train, and calculating the current control level of the train according to the control curve.

3. The method according to claim 1, wherein the acquiring current train operation data and calculating an evaluation score according to the current train operation data comprises:
   acquiring the current train operation data, and acquiring an evaluation parameter and a weight value of the evaluation parameter according to the current train operation data; and
   calculating the evaluation score according to the evaluation parameter and the weight value of the evaluation parameter.

4. The method according to claim 3, wherein the acquiring an evaluation parameter and a weight value of the evaluation parameter according to the current train operation data comprises:
   acquiring an actual train operation speed, the current control level, and train control delay;
   acquiring a speed difference according to the actual train operation speed and a configured speed;
   acquiring an actual acceleration value according to the current control level, and acquiring an acceleration difference according to the actual acceleration value and a configured acceleration value;
   acquiring a delay difference according to the train control delay and a configured delay; and
   acquiring a weight value of each of the speed difference, the acceleration difference, and the delay difference, and wherein the evaluation parameter comprises the speed difference, the acceleration difference, or the delay difference.

5. The method according to claim 4, wherein the calculating the evaluation score according to the evaluation parameter and the weight value of the evaluation parameter comprises:
   calculating the evaluation score according to the speed difference, the acceleration difference, the delay difference, and the weight values corresponding thereto.

6. The method according to claim 5, wherein the calculating the evaluation score according to the speed difference, the acceleration difference, the delay difference, and the weight values corresponding thereto comprises:
   calculating the evaluation score according to an evaluation formula:

$$A = \alpha \times \text{speed difference} + \beta \times \text{acceleration difference} + \gamma \times \text{delay difference} + \delta, \text{wherein}$$

A is the evaluation score, $\alpha$, $\beta$, and $\gamma$ are the weight values of the evaluation parameters, $\delta$ is a tolerance error, and $\alpha + \beta + \gamma = 1$.

7. The method according to claim 4, wherein the inputting the current train operation data and the evaluation score into a neural network learning system to adjust the current control level of the train comprises:
   inputting the current train operation data and the evaluation score into the neural network learning system;
   determining, by the neural network learning system, whether the evaluation score of the current train operation data is lower than a threshold; and
   in response to determining that the evaluation score of the current train operation data is lower than the threshold, determining a target train control level according to the current train operation data, and acquiring target train operation data of the target train control level; and
   processing the target train operation data of the target train control level to obtain a target evaluation parameter configured for the train, comparing the configured target evaluation parameter with the evaluation parameter of the current train operation data to calculate a corresponding level adjustment value, and adjusting the current control level according to the level adjustment value to obtain the final outputted control level.

8. The method according to claim 7, wherein the adjusting the current control level according to the level adjustment value to obtain the final outputted control level comprises:
   outputting the level adjustment value of the current train operation data to the train traction control system, and controlling, by the train traction control system, operation of the train according to the final outputted control level.

9. The method according to claim 7, wherein the inputting the current train operation data and the evaluation score into a neural network learning system to adjust the current control level of the train further comprises:
in response to determining that the evaluation score of the current train operation data is not lower than the threshold, retaining the current control level as the final outputted control level.

10. The method according to claim 7, wherein the evaluation parameter of the current train operation data and the configured target evaluation parameter have a same parameter type.

11. A computer device, comprising a memory, a processor, and a computer program stored in the memory and executable in the processor, wherein the processor, when executing the computer program, performs operations comprising:
acquiring a current control level of a train and outputting the current control level to a train traction control system;
acquiring current train operation data and calculating an evaluation score according to the current train operation data by the train traction control system; and
inputting the current train operation data and the evaluation score into a neural network learning system to adjust the current control level of the train to obtain a final outputted control level.

12. The device according to claim 11, wherein the acquiring a current control level of a train comprises:
acquiring a control curve of the train, and calculating the current control level of the train according to the control curve.

13. The device according to claim 11, wherein the acquiring current train operation data and calculating an evaluation score according to the current train operation data comprises:
acquiring the current train operation data, and acquiring an evaluation parameter and a weight value of the evaluation parameter according to the current train operation data; and
calculating the evaluation score according to the evaluation parameter and the weight value of the evaluation parameter.

14. The device according to claim 13, wherein the acquiring an evaluation parameter and a weight value of the evaluation parameter according to the current train operation data comprises:
acquiring an actual train operation speed, the current control level, and train control delay;
acquiring a speed difference according to the actual train operation speed and a configured speed;
acquiring an actual acceleration value according to the current control level, and acquiring an acceleration difference according to the actual acceleration value and a configured acceleration value;
acquiring a delay difference according to the train control delay and a configured delay; and
acquiring a weight value of each of the speed difference, the acceleration difference, and the delay difference, and wherein the evaluation parameter comprises the speed difference, the acceleration difference, or the delay difference.

15. The device according to claim 14, wherein the calculating the evaluation score according to the evaluation parameter and the weight value of the evaluation parameter comprises:
calculating the evaluation score according to the speed difference, the acceleration difference, the delay difference, and the weight values corresponding thereto.

16. The device according to claim 15, wherein the calculating the evaluation score according to the speed difference, the acceleration difference, the delay difference, and the weight values corresponding thereto comprises:
calculating the evaluation score according to an evaluation formula:

$$A = \alpha \times \text{speed difference} + \beta \times \text{acceleration difference} + \gamma \times \text{delay difference} + \delta, \text{ wherein}$$

A is the evaluation score, $\alpha$, $\beta$, and $\gamma$ are the weight values of the evaluation parameters, $\delta$ is a tolerance error, and $\alpha + \beta + \gamma = 1$.

17. The device according to claim 14, wherein the inputting the current train operation data and the evaluation score into a neural network learning system to adjust the current control level of the train comprises:
inputting the current train operation data and the evaluation score into the neural network learning system;
determining, by the neural network learning system, whether the evaluation score of the current train operation data is lower than a threshold; and
in response to determining that the evaluation score of the current train operation data is lower than the threshold, determining a target train control level according to the current train operation data, and acquiring target train operation data of the target train control level; and
processing the target train operation data of the target train control level to obtain a target evaluation parameter configured for the train, comparing the configured target evaluation parameter with the evaluation parameter of the current train operation data to calculate a corresponding level adjustment value, and adjusting the current control level according to the level adjustment value to obtain the final outputted control level.

18. The device according to claim 17, wherein the adjusting the current control level according to the level adjustment value to obtain the final outputted control level comprises:
outputting the level adjustment value of the current train operation data to the train traction control system, and controlling, by the train traction control system, operation of the train according to the final outputted control level.

19. The device according to claim 17, wherein the inputting the current train operation data and the evaluation score into a neural network learning system to adjust the current control level of the train further comprises:
in response to determining that the evaluation score of the current train operation data is not lower than the threshold, retaining the current control level as the final outputted control level.

20. A non-transitory computer-readable storage medium, storing a computer program, wherein the computer program, when executed by a processor, causes the processor to perform operations comprising:
acquiring a current control level of a train and outputting the current control level to a train traction control system;

acquiring current train operation data and calculating an evaluation score according to the current train operation data by the train traction control system; and inputting the current train operation data and the evaluation score into a neural network learning system to adjust the current control level of the train to obtain a final outputted control level.

\* \* \* \* \*